(12) United States Patent
Goodson et al.

(10) Patent No.: US 8,965,209 B2
(45) Date of Patent: Feb. 24, 2015

(54) SYSTEMS AND METHODS FOR EXTENDING OPTICAL NETWORK SERVICES ACROSS NON-OPTICAL CHANNELS

(75) Inventors: Richard Goodson, Huntsville, AL (US); Leif J. Sandstrom, Madison, AL (US); Kevin W. Schneider, Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 416 days.

(21) Appl. No.: 13/178,243

(22) Filed: Jul. 7, 2011

(65) Prior Publication Data

US 2013/0011142 A1    Jan. 10, 2013

(51) Int. Cl.
 *H04J 14/08* (2006.01)
 *H04J 14/00* (2006.01)
 *H04Q 11/00* (2006.01)
 *H04B 10/272* (2013.01)

(52) U.S. Cl.
 CPC ......... *H04Q 11/0067* (2013.01); *H04B 10/272* (2013.01); *H04Q 11/0071* (2013.01); *H04Q 2011/0064* (2013.01)
 USPC ................... 398/98; 398/43; 398/33; 398/38; 398/37

(58) Field of Classification Search
 USPC ....................................................... 398/43, 98
 See application file for complete search history.

(56) References Cited

U.S. PATENT DOCUMENTS

| | | | |
|---|---|---|---|
| 5,572,349 A * | 11/1996 | Hale et al. ...................... | 398/100 |
| 6,678,375 B1 | 1/2004 | Henderson et al. | |
| 2004/0170173 A1 | 9/2004 | Pan et al. | |
| 2006/0198635 A1 * | 9/2006 | Emery et al. .................... | 398/38 |
| 2008/0019697 A1 * | 1/2008 | Sala et al. ....................... | 398/99 |
| 2008/0159744 A1 | 7/2008 | Soto et al. | |
| 2008/0310842 A1 * | 12/2008 | Skrobko ........................ | 398/72 |
| 2009/0060531 A1 * | 3/2009 | Biegert et al. ................ | 398/214 |
| 2009/0214222 A1 | 8/2009 | Grossman et al. | |
| 2010/0104287 A1 | 4/2010 | Biegert et al. | |
| 2011/0058813 A1 | 3/2011 | Boyd et al. | |

OTHER PUBLICATIONS

Schneider, U.S. Appl. No. 12/839,403, entitled, "Systems and Methods for Powering a Service Unit," filed Jul. 19, 2010.
Sandstrom, U.S. Appl. No. 12/619,397, entitled, "Access Muitiplexers and Methods for Multiplexing Telecommunications Signals Using an Arrayed Media Converter," filed Nov. 16, 2009.

* cited by examiner

*Primary Examiner* — Oommen Jacob
(74) *Attorney, Agent, or Firm* — Maynard, Cooper & Gale, P.C.; Jon E. Holland

(57) ABSTRACT

An optical communication system comprises a network interface device (NID) having a media converter coupled to an optical fiber of a passive optical network (PON). The media converter converts optical signals from the PON into electrical signals for communication across at least one non-optical channel, such as a conductive or wireless connection, to customer premises equipment (CPE), such as a residential gateway or other customer premises (CP) device. Rather than implementing an optical media access control (optical MAC) layer in the NID, an optical MAC layer for handling PON protocols and management is implemented by the CPE, thereby effectively extending the customer end of the PON across at least one non-optical connection to the CPE. By implementing the optical MAC layer at the CPE, the complexity of the NID is reduced thereby lowering the cost of the NID. In one embodiment, in an effort to further reduce the complexity of the NID, the optical MAC layer is configured to control a laser-on state of an optical transmitter in the NID.

11 Claims, 8 Drawing Sheets

US 8,965,209 B2

SYSTEMS AND METHODS FOR EXTENDING OPTICAL NETWORK SERVICES ACROSS NON-OPTICAL CHANNELS

RELATED ART

In a traditional fiber-to-the-home (FTTH) architecture, a network interface device (NID) with ONU functionality is typically installed on a side of a customer's house in order to terminate a passive optical network (PON) connection. The NID is a relatively complex device that has an optical PON interface toward the network, and a non-optical interface toward the user. The optical portion of the NID includes an optical media access control (optical MAC) layer for handling PON protocols and management. The optical MAC layer converts between physical layer optical signals and distinct data units, such as Ethernet frames. The non-optical portion of the NID includes a non-optical media access control (non-optical MAC) layer for handling non-optical protocols and management. The non-optical MAC layer converts between physical layer non-optical signals and distinct data units, such as Ethernet frames.

In the downstream direction, the optical MAC layer in the NID receives packets from the PON and typically strips overhead used for the PON protocols and management. The optical MAC layer then packetizes the data, and passes the packets to the non-optical MAC layer for transmission across one or more non-optical connections, such as twisted-wire pairs or coax, to devices (e.g., a residential gateway) in the residence using protocols (e.g., Ethernet) suitable for the media over which the packets are communicated.

In the upstream direction, the optical MAC layer in the NID communicates with an optical line terminal (OLT) on a network side of the PON, and the OLT allocates time slots in which the optical MAC layer is permitted to transmit across the PON. The non-optical MAC layer in the NID receives electrical signals carrying data (e.g., Ethernet frames). The non-optical MAC layer packetizes the data and passes the packets to the optical MAC layer. During the allocated time slots, the optical MAC layer adds overhead related to PON protocols and modulates an optical signal with the packetized data for transmission across the PON.

Unfortunately, the formatting, communicating, and managing operations performed by the NID require complex circuitry that is relatively expensive and has relatively high power requirements, thereby increasing installation costs to a service provider of the PON.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for extending optical network services across non-optical channels, such as conductive or wireless connections. In one exemplary embodiment, a network interface device (NID) at a customer premises has a media converter coupled to an optical fiber of a passive optical network (PON). The media converter converts optical signals from the PON into electrical signals for communication across at least one non-optical channel to customer premises equipment (CPE), such as a residential gateway or other customer premises (CP) device. Rather than implementing an optical media access control (optical MAC) layer in the NID, an optical MAC layer for handling PON protocols and management is implemented by a CP device, thereby effectively extending the customer end of the PON across at least one non-optical connection to the CP device. By implementing the optical MAC layer at the CP device, the complexity of the NID is reduced, thereby lowering the cost of the NID. In one exemplary embodiment, in an effort to further reduce the complexity of the NID, the optical MAC layer is configured to control the laser-on state of an optical transmitter in the NID.

In addition, by reducing the complexity of the NID, the power requirements of the NID may be decreased. In one exemplary embodiment, sufficient electrical power is provided from the CP device across an electrical connection between the CP device and the NID so that it is unnecessary for the NID to have a separate power source, such as a battery or network power.

Figure 1:
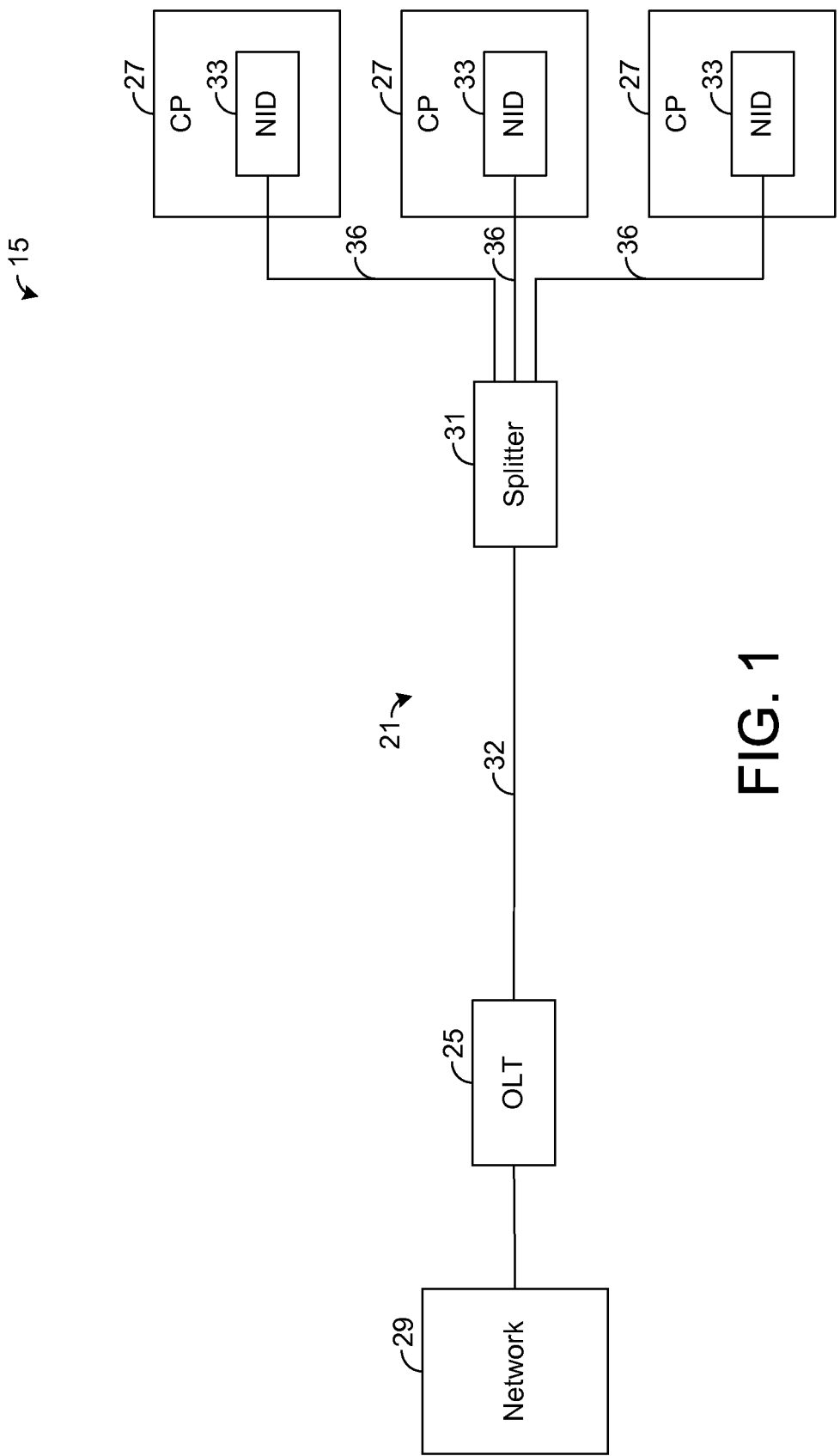
FIG. 1 is a block diagram illustrating an exemplary embodiment of a communication system.

FIG. 1 depicts an exemplary embodiment of a communication system 15 that uses a passive optical network (PON) 21 to communicate across a segment of the system 15 between an optical line terminal (OLT) 25, which terminates one end of the PON 21, and a plurality of customer premises 27. As shown by FIG. 1, the system 15 comprises a telecommunication network 29, such as the public switched telephone network (PSTN), that is coupled to the OLT 25. The OLT 25 is coupled to a splitter 31 by an optical fiber 32, and the splitter 31 is coupled to a plurality of network interface devices (NIDs) 33 via a plurality of optical fibers 36 such that a point-to-multipoint architecture is defined by the OLT 25 and the NIDs 33. Although the exemplary network 21 is passive and point-to-multipoint, active and/or point-to-point optical networks may be used in other embodiments for communication between the OLT 25 and the NIDs 33.

Figure 2:
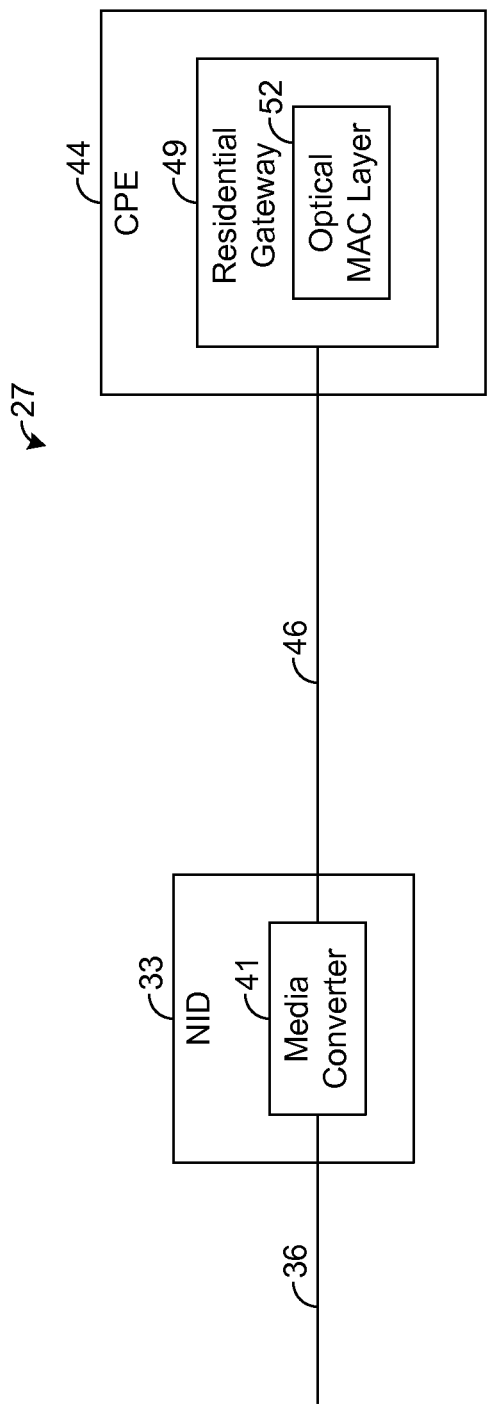
FIG. 2 is a block diagram illustrating an exemplary embodiment of a customer premises, such as is depicted by FIG. 1.

FIG. 2 depicts an exemplary embodiment of a customer premises (CP) 27. As shown by FIG. 2, an NID 33 at the CP 27 comprises a media converter 41 that is coupled to an optical fiber 36 of the PON 21. The media converter 41 is also communicatively coupled to customer premises equipment (CPE) 44 via a non-optical channel 46. The channel 46 comprises at least one electrically conductive connection, such as a twisted wire pair or coaxial cable, although other types of connections, such as a wireless connection, may be used in other embodiments. In one exemplary embodiment, the channel 46 comprises an Ethernet cable, such as a Category 5 (Cat-5) cable, that has a plurality of conductive connections, such as twisted-wire pairs, bound within a binder.

Various types of devices may be used to implement the CPE 44. In one exemplary embodiment, the CPE 44 comprises a residential gateway 49 that implements an optical media access control (MAC) layer 52. In other embodiments, the optical MAC layer 52 may be implemented by other types of devices at the CP 27.

Referring to FIG. 1, in a downstream direction, the OLT 25 receives data from the network 29 and transmits the data via optical signals across the PON 21. Specifically, the OLT 25 packetizes the data into a plurality of data packets according to an optical protocol, such as Ethernet PON (EPON), and formats the data packets for transmission across the PON 21 in accordance with such protocol. The OLT 25 modulates an optical signal with a bit stream comprising the data packets, thereby forming an optical data signal, and transmits the optical data signal across the optical fiber 32 to the splitter 31, which splits the optical data signal for transmission to each of the NIDs 33 via the optical fibers 36.

Referring now to FIG. 2, the media converter 41 of the NID 33 receives the optical data signal and converts such signal to an electrical data signal for communication to the CPE 44. Specifically, the media converter 41 demodulates the optical data signal received from the fiber 36 in order to recover the bit stream originally transmitted by the OLT 25, and the media converter 41 modulates an electrical carrier signal with the recovered data bits, thereby forming an electrical data signal. The media converter 41 then transmits the electrical data signal via the channel 46 to the CPE 44. In one exemplary embodiment, the electrical data signal is carried by a Gigabit Ethernet (GigE) connection defining the channel 46, but other types of connections may be used in other embodiments.

Note that the optical formats and protocols used for communication across the PON 21 are preserved for communication across the channel 46. That is, the data packets carried by the channel 46 are in accordance with the same optical protocol used for communication across the PON 21. Indeed, in one exemplary embodiment, the media converter 41 makes no changes to the data packets and simply passes the data packets through the NID 33 with no change except for changing the communication from an optical domain to an electrical domain. As an example, when EPON is used for the PON 21, GigE transceivers may be used by the media converter 41 and CPE 44 to communicate the bit stream across the channel 46. In such an example, both sides of the media converter 41 are Ethernet, and the bit stream can be passed through the media converter 41 with little or no changes to the packet headers.

Although it is possible to pass the bit stream through the media converter 41 with no format changes whatsoever to the data packets of the bit stream depending on the device types and protocols implemented by the media converter 41 and the CPE 44, in some cases, it may be desirable to make at least some modifications to the data packets to facilitate communication across the channel 46. However, if care is taken in the protocols selected on both sides of the media converter 41, it is possible to select consistent protocols so that the media converter 41 makes little or no change to the packets passing through it, thereby lowering the complexity of the circuitry in the media converter 41.

In the upstream direction, the residential gateway 49 packetizes data into data packets for transmission to the OLT 25 (FIG. 1). For each packet, the optical MAC layer 52 controls the format of the packet and defines overhead pertaining to Layer 1 (physical layer) of the Open Systems Interconnection (OSI) model. Such overhead remains in the packets as they are carried by the PON 21 and is used for transporting the packets across the PON 21. In one exemplary embodiment, the overhead is in accordance with EPON or other optical protocol employed by the PON 21 such that the packets may be carried by the PON 21, as will be described in more detail below. Once the packets are formed, the residential gateway 49 modulates an electrical carrier signal with a bit stream comprising the data packets, thereby forming an electrical data signal, and transmits the electrical data signal across the channel 46 to the media converter 41.

The media converter 41 receives the electrical data signal from the channel 46 and passes the bit stream carried by the electrical data signal to the PON 21 with little or no change, as described above for the downstream direction, except for converting the communication from an electrical domain to an optical domain. That is, the media converter 41 demodulates the electrical data signal received from the channel 46 to recover the bit stream originally transmitted by the CPE 44, and the media converter 41 modulates an optical signal with the bit stream for transmission across the PON 21. As described above for the downstream direction, if care is taken in the protocols selected on both sides of the media converter 41, it is possible to select consistent protocols so that the media converter 41 makes little or no change to the packets of the bit stream passing through it in the upstream direction.

The optical signal modulated by the media converter 41 is transmitted across the optical fiber 36 to the splitter 31, which transmits optical data signals received from all of the customer premises 27 across the fiber 32 to the OLT 25. In order to prevent data collisions, the optical signals transmitted across the PON 21 are time-division multiplexed (TDM), as will be described in more detail below. The OLT 25 demodulates the optical data signals received from the fiber 32 to recover the data packets transmitted by the NIDs 33, and the OLT 25 transmits the data of such packets to the network 29.

As described above, the upstream optical signals are time-division multiplexed in order to prevent data collisions on the PON 21. Such multiplexing is generally controlled by the OLT 25 via a control channel between the OLT 25 and the equipment at the customer premises 27. In this regard, embedded within the data streams communicated between the OLT 25 and the customer premises 27 is a control channel that can be used to pass management and control information between the OLT 25 and the customer premises 27. As an example, the OLT 25 transmits to the optical MAC layer 52 control information indicative of time slots in which the optical MAC layer 52 is permitted to transmit across the PON 21. The time slots assigned to the equipment at one customer premises 27 are controlled by the OLT 25 such that, at any given time on the shared optical fiber 32, no more than one CP device is permitted to transmit across the PON 21, thereby preventing data collisions. In other examples, other types of management and control information may be communicated by the OLT 25 and the equipment at the customer premises 27.

Note that the PON termination functions are effectively split across multiple devices (i.e., the residential gateway 49 and the media converter 41 in the exemplary embodiment shown by FIG. 2) such that the media converter 41 and the residential gateway 49 effectively implement a distributed optical network unit (ONU). Specifically, the media converter 41 provides optical/electrical conversion, and the residential gateway 49 performs PON management and Layer 1 control of the PON traffic. By splitting the PON termination functions in such manner, the edge of the PON 21 is effectively extended over a non-optical channel 46 to the residential gateway 49. Such extension reduces the complexity of the NID 33 enabling the cost and power consumption of the NID 33 to be reduced as well.

Figure 3:
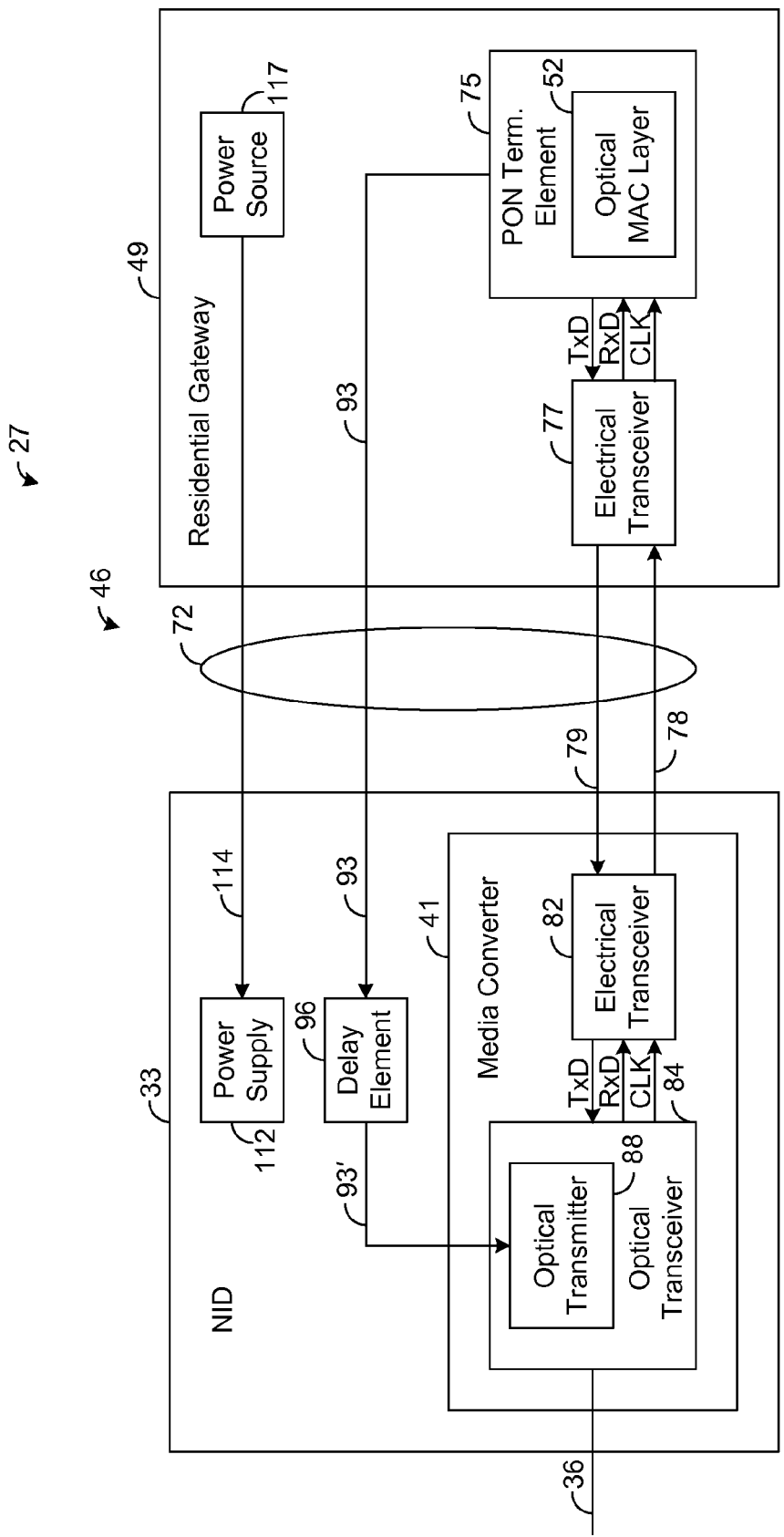
FIG. 3 is a block diagram illustrating an exemplary embodiment of a customer premises, such as is depicted by FIG. 1.

FIG. 3 depicts an exemplary embodiment of the NID 33 and the residential gateway 49 at a customer premises 27. In the exemplary embodiment shown by FIG. 3, the media converter 41 is coupled to the residential gateway 49 via an Ethernet cable 72, such as Cat-5 cable, in which a plurality of conductive connections, such as twisted-wire pairs, are bound. However, it should be emphasized that other types of connections are possible in other embodiments.

As shown by FIG. 3, the residential gateway 49 comprises a PON termination element 75 that is configured to perform PON termination functions. Specifically, the PON termination element 75 comprises the optical MAC layer 52, which is configured to control the format and timing of the data packets transmitted from the residential gateway 49. The PON termination element 75 is coupled to an electrical transceiver 77 that is configured to demodulate at least one electrical data signal 78 received from the media converter 41 in the downstream direction. The electrical transceiver 77 is also configured to modulate at least one electrical carrier signal with data from the PON termination element 75 in the upstream direction, thereby forming at least one electrical data signal 79 for transmission to the media converter 41.

As further shown by FIG. 3, the media converter 41 comprises an electrical transceiver 82 configured to demodulate each electrical data signal 79 received from the residential gateway 49 in the upstream direction. The electrical transceiver 82 is also configured to modulate at least one electrical carrier signal with data from an optical transceiver 84 in the downstream direction, thereby forming at least one electrical data signal 78 for transmission to the residential gateway 49. The optical transceiver 84 is configured to demodulate an optical data signal received from the fiber 36 in the downstream direction and to modulate an optical signal with data from the electrical transceiver 82 in the upstream direction, thereby forming an optical data signal for transmission to the OLT 25 (FIG. 1).

In one exemplary embodiment, the optical transceiver 84 recovers a clock signal (CLK) from the optical data signal that is received from the fiber 36. Such clock signal is synchronous to a clock signal used by the OLT 25 (FIG. 1) in order to control timing and, specifically, to control the timing of communication across the PON 21. The optical transceiver 84 transmits the recovered clock signal to the electrical transceiver 82, which uses such clock signal to control the timing of each electrical data signal 78 transmitted to the residential gateway 49. The electrical transceiver 77 is configured to recover a clock signal from a received data signal 78. Such clock signal is synchronous to the clock signal used by the electrical transceiver 82 to transmit such data signal 78 and, hence, is synchronous to the clock signal that is used by the OLT 25 for communicating across the PON 21. The electrical transceiver 77 is configured to transmit the recovered clock signal to the PON termination element 75. Therefore, the optical MAC layer 52 has access to a clock signal that is synchronous to the clock signal of the OLT 25, and the optical MAC layer 52 uses the clock signal recovered from the data signal 78 to control the timing of transmissions from the residential gateway 49 across the PON 21, as will be described in more detail hereafter.

Note that there are various techniques that can be used to recover clock signals from data signals. Exemplary techniques for recovering clock signals are described in commonly-assigned U.S. Pat. No. 7,742,505, entitled "Systems and Methods for Enabling Clock Signal Synchronization" and filed on Dec. 14, 2006, which is incorporated herein by reference. Using such techniques, the clock signal recovered by the electrical transceiver 77 and used by the optical MAC layer 52 is traceable to the clock signal used by the OLT 25. Using a clock signal that is traceable to the clock signal of the OLT 25 helps to reduce uncertainty during PON ranging and subsequent bandwidth allocation.

As shown by FIG. 3, the optical transceiver 84 includes an optical transmitter 88, such as a laser diode, that is configured to transmit an optical signal across the fiber 36. As described above, the optical transceiver 84 is permitted to transmit data across the PON 21 only during times that have been allocated by the OLT 25 for transmissions from the optical MAC layer 52. Outside of such times, the optical transmitter 88 should generally be turned off such that it transmits no light across the fiber 36, thereby preventing the optical transmitter 88 from interfering with the data communicated by other NIDs 33.

The optical transmitter 88 receives a delayed version 93' of a control signal 93, referred to hereafter as the "transmit (TX)-enable signal," that controls the laser-on state of the optical transmitter 88. In the laser-on state, the optical transmitter 88 is powered up and ready to transmit data. In a laser-off state, the optical transmitter 88 is powered down and unable to transmit data. When the TX-enable signal 93' is asserted, the laser in the optical transmitter 88 is turned on such that it can transmit light across the fiber 36, thereby transitioning the optical transmitter 88 to the laser-on state. Such light is modulated with data if the optical transmitter 88 is receiving data from the electrical transceiver 82. When the TX-enable signal 93' is deasserted, the laser in the optical transmitter 88 is turned off such that it does not emit light, thereby transitioning the optical transmitter 88 to the laser-off state. For a given time slot allocated for transmissions from the optical MAC layer 52, the optical MAC layer 52 controls the timing of the TX-enable signal 93 such that the optical transmitter 88 begins emitting light just prior to receiving data for the time slot, within a desired margin of error, and such that the optical transmitter 88 stops emitting light just after transmitting the data for the time slot, within a desired margin of error.

Note that there is a finite amount of time for the optical transmitter 88 to switch between laser-on and laser-off states. In particular, upon assertion of the TX-enable signal 93' while the optical transmitter 88 is turned off, there is a finite amount of time required for the optical transmitter 88 to power up and begin emitting light so that it is ready to transmit data. Such delay shall be referred to hereafter as the transmitter's "power-up delay." Further, upon deassertion of the TX-enable signal 93' while the optical transmitter 88 is turned on, there is a finite amount of time required for the optical transmitter 88 to power down such that it stops emitting light across the fiber 36 coupled to it and, hence, the fiber 32 that is shared by multiple NIDs 33. Such delay shall be referred to hereafter as the transmitter's "power-down delay."

For a time slot allocated for transmissions from the optical MAC layer 52, the TX-enable signal 93' is asserted in order to turn on the optical transmitter 88 before data communicated in the time slot is received by the optical transmitter 88. The timing of data transmission by the residential gateway 49 is controlled relative to assertion of the TX-enable signal 93 to account for power-up delay. In an effort to maximize transmission time during the allocated time slot, data is transmitted from the optical MAC layer 52 such that it begins to arrive at the optical transmitter 88 after assertion of the TX-enable signal 93' at the optical transmitter 88 by an amount of time approximately equal to (within a desired margin of error) the power-up delay for the optical transmitter 88. Accordingly, the optical transmitter 88 should have sufficient time to sense the assertion of the TX-enable signal 93' and power up so that it is ready to transmit the data from the residential gateway 49 when such data arrives at the transmitter 88.

Also, close to the end of a time slot allocated for transmissions from the optical MAC layer 52, the TX-enable signal 93' is deasserted in order to transition the optical transmitter 88 from a laser-on state to a laser-off state. The timing of deassertion of the TX-enable signal 93 is controlled such that the optical transmitter 88 has stopped receiving data for transmission across the fiber 36 before the TX-enable signal 93' is deasserted at the optical transmitter 88.

In the embodiment shown by FIG. 3, splitting of PON termination functions between the media converter 41 and the residential gateway 49 introduces delays that can affect the timing of the TX-enable signal 93 relative to the flow of data from the residential gateway 49. Specifically, the transmission of data from the residential gateway 49 to the media converter 41, including the modulating and demodulating respectively performed by the electrical transceivers 77 and 82, increases the delay between transmission of data by the optical MAC layer 52 and reception of such data by the optical transmitter 88. The delay introduced by the modulation and demodulation performed by the transceivers 77 and 82 shall be referred to hereafter as "modulation delay."

Further, in some embodiments, the TX-enable signal 93 may not experience such modulation delay. As an example, the TX-enable signal 93 may be transmitted via an unmodulated control channel between the residential gateway 49 and the media converter 41, or the TX-enable signal 93 may be transmitted via a control channel having less modulation delay relative to the data channel carrying the data from the optical MAC layer 52 to the media converter 41. In such embodiments, an additional delay may be introduced to the TX-enable signal 93 prior to reception of such signal by the optical transmitter 88 in order to maintain a desired timing relationship between the TX-enable signal 93 and the flow of data from the optical MAC layer 52. This additional delay may be implemented at the media converter 41 or be distributed between the media converter 41 and the NID 33. In one exemplary embodiment, as shown by FIG. 3, the NID 33 includes a delay element 96 that is configured to receive and sufficiently delay the TX-enable signal 93 so that the timing relationship between the TX-enable signal 93 and flow of data at the time of transmission by the optical MAC layer 52 is maintained at the input of the optical transmitter 88. In this regard, the delay element 96 delays the TX-enable signal 93 by an amount equal to the difference between the time required to transmit the TX-enable signal 93 from the optical MAC layer 52 to the optical transmitter 88 and the time required to transmit data from the optical MAC layer 52 to the optical transmitter 88.

In one exemplary embodiment, the optical MAC layer 52 accounts for power-up delay when transmitting the TX-enable signal 93 relative to the data stream for a given time slot, and the delay element 96 accounts for the modulation delay differences between the TX-enable signal 93 and the data stream. For example, the optical MAC layer 52 may assert the TX-enable signal 93 prior to transmitting the beginning of a data stream for a given time slot by an amount of time approximately equal to the power-up delay of the transmitter 88 within a desired margin of error. The delay element 96 delays the TX-enable signal 93 by an amount approximately equal to the difference in modulation delays for the TX-enable signal 93 and the data stream such that the assertion of the TX-enable signal 93' is separated from the data stream at reception by the optical transmitter 88 by approximately the same amount of time as upon transmission by the optical MAC layer 52 (i.e., separated by an amount of time approximately equal to the power-up delay).

In other embodiments, other techniques for controlling the timing relationship between the TX-enable signal 93 and the data stream are possible. Regardless of the control techniques used for a given time slot allocated to the optical MAC layer 52, the optical MAC layer 52 preferably begins transmitting data at the start of such time slot, and the TX-enable signal 93 is preferably asserted just prior to the data stream arriving at the optical transmitter 88, thereby giving the optical transmitter 88 sufficient time to turn on before the data stream is received by it.

There are various techniques that can be used to power the NID 33. As an example, the NID 33 can comprise one or more batteries. However, using a battery at the NID 33 increases the maintenance costs and burdens of the NID 33. In one exemplary embodiment, as shown by FIG. 3, the NID 33 includes a power supply 112 that is configured to receive a power signal 114 from the residential gateway 49. The power supply 112 uses the power signal 114 to power the components of the NID 33 so that a separate power source, such as a battery, is not required at the NID 33. In this regard, the power supply 112 uses known techniques to condition the power signal 114 for providing power to the other components of the NID 33, such as the transceivers 82 and 84.

As shown by FIG. 3, the residential gateway 49 has a power source 117, such as at least one battery, for generating the power signal 114, which is transmitted through the cable 72 to the power supply 112 at the NID 33. In one exemplary embodiment, power over Ethernet (PoE) technology is used to transmit the power signal 114 from the residential gateway 49 to the NID 33. I.E.E.E. 802.3af-2003 and I.E.E.E. 802.3at-2009 define various standards governing the transmission of electrical power signals across Ethernet connections, referred to as PoE. In PoE, power is transmitted in the common mode across two or more differential wire pairs of an Ethernet cable, such as a Cat-5 cable. In other embodiments, other techniques may be used for providing electrical power from the residential gateway 49 or other CP device to the NID 33.

The PoE standards define an out-of-band control channel that can be used for transporting control information. In this regard, the common-mode signal that can be used to transfer power, as described above, can also be modulated with data to provide a limited data rate that is typically used as a control channel. In one exemplary embodiment, the common-mode signal transmitted from the residential gateway 49 to the NID 33 is used to transfer power for powering the components of the NID 33, as described above, and also defines an out-of-band control channel that is used for transferring the TX-enable signal 93 to the NID 33.

Figure 4:
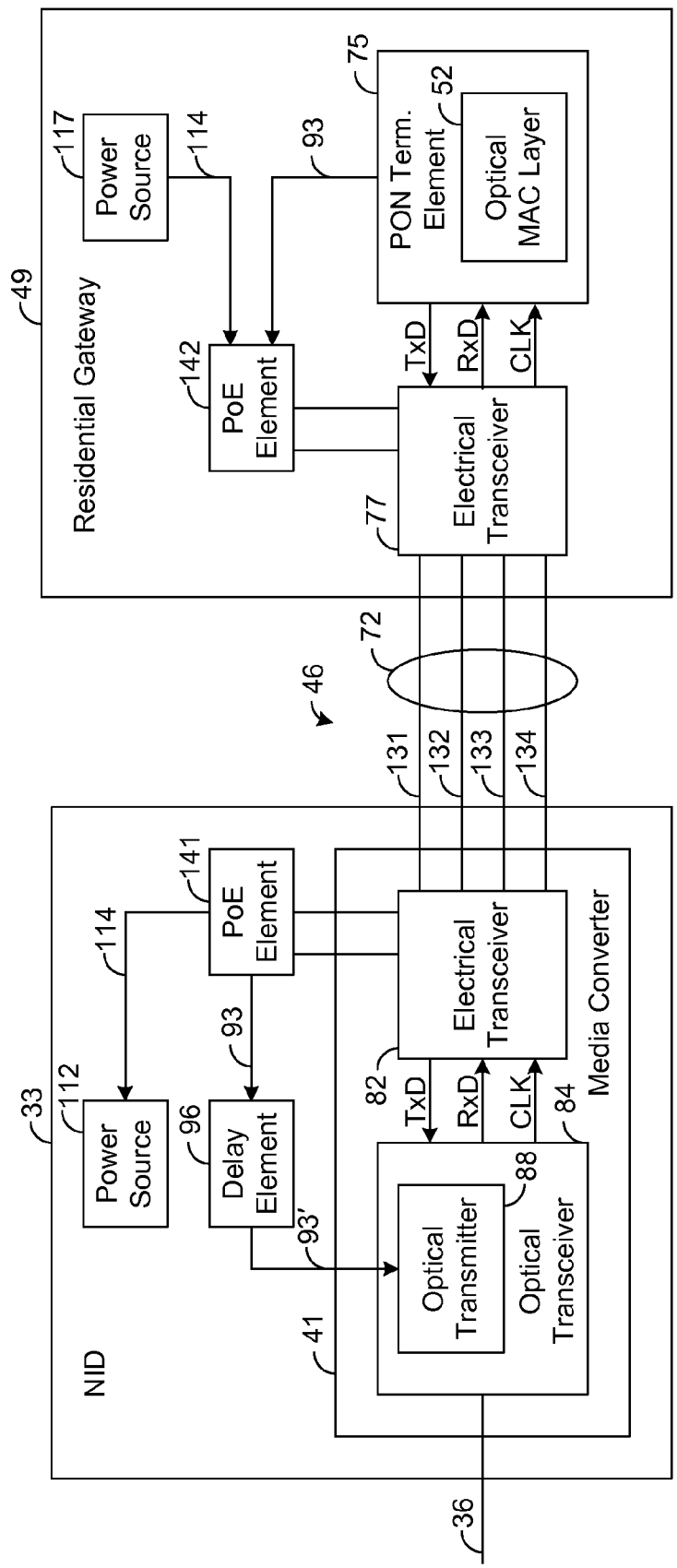
FIG. 4 is a block diagram illustrating an exemplary embodiment of a customer premises, such as is depicted by FIG. 1.

FIG. 4 depicts an exemplary embodiment of the NID 33 and the residential gateway 49 when the TX-enable signal 93 is transported via a control channel of PoE. For illustrative purposes, it is assumed for the embodiment shown by FIG. 4 that the cable 72 is a Cat-5 cable having four conductive connections 131-134 in which each conductive connection 131-134 comprises a respective twisted-wire pair. In addition, each connection 131-134 is used for differential-mode bi-directional data transport between the electrical transceivers 77 and 82. That is, each connection 131-134 respectively carries a modulated data signal from the electrical transceiver 82 to the electrical transceiver 77 and respectively carries a modulated data signal from the electrical transceiver 77 to the electrical transceiver 82. In other embodiments, other types of cables and/or connections may be used between the residential gateway 49 and the NID 33.

As shown by FIG. 4, the NID 33 and the residential gateway 41 respectively include PoE elements 141 and 142 that are configured to communicate a PoE common-mode signal across two of the connections 131 and 132 in which each connection 131 and 132 is a twisted-wire pair in the instant embodiment. In this regard, the PoE element 142 transmits across the connections 131 and 132 a common-mode signal derived from the power signal 114 from the power supply 117, and such common-mode signal defines an out-of-band control channel that the PoE element 142 uses to transport TX-enable signal 93. Thus, each of the connections 131-134 carry differential-mode data signals in both direction, and connections 131 and 132 carry a common-mode signal that is used to transport power and the TX-enable signal 93 to the NID 33.

The PoE element 141 receives the PoE common-mode signal transmitted across the connections 131 and 132, demodulates such signal in order to recover the TX-enable signal 93, and extracts the power supply signal 114. The PoE element 141 transmits to the power supply 112 the power signal 114, and the PoE element 141 also transmits the TX-enable signal 93 to the delay element 96.

Accordingly, in the exemplary embodiment shown by FIG. 4, the optical MAC layer 52 of the residential gateway 49 is configured to provide a TX-enable signal 93 that is communicated through the cable 72 and used to appropriately control the laser-on state of the optical transmitter 88. However, it should be emphasized that other configurations and techniques for controlling the timing of the optical transmitter 88 are possible in other embodiments.

Figure 5:
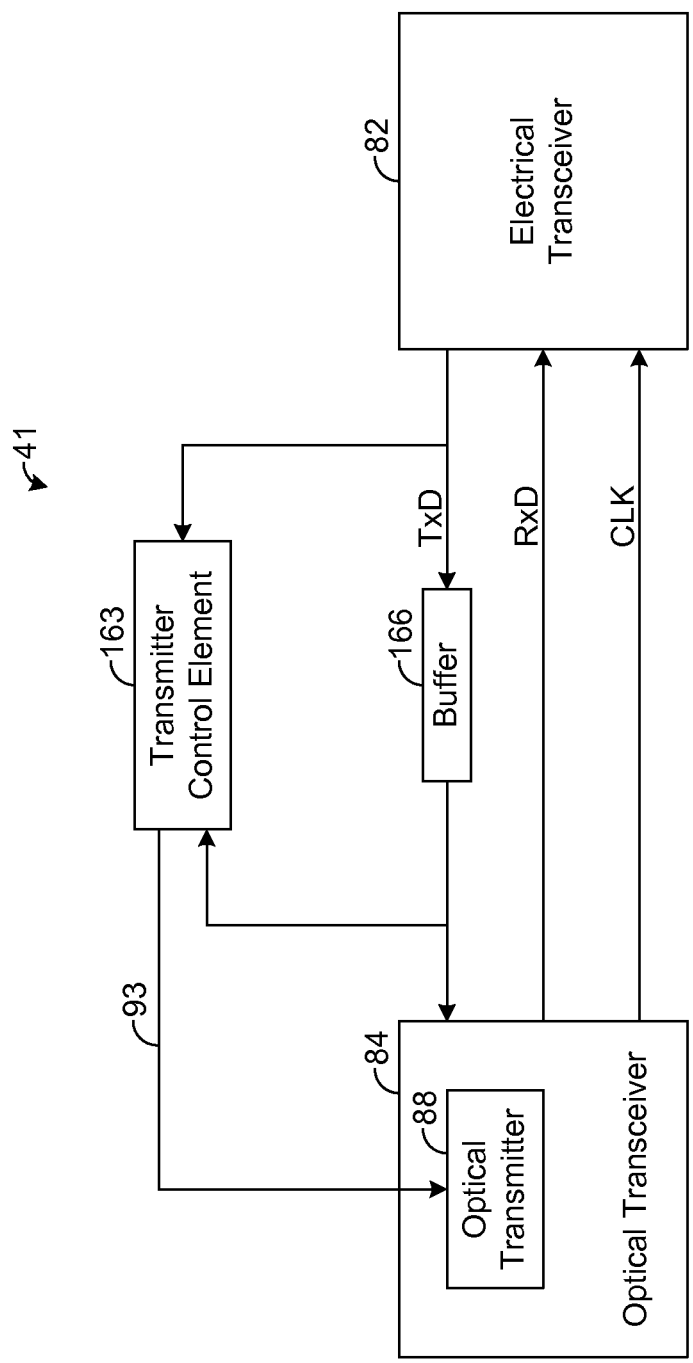
FIG. 5 is a block diagram illustrating an exemplary embodiment of a media converter, such as is depicted by FIG. 2.

As an example, in one exemplary embodiment, the TX-enable signal 93 is generated at the NID 33, and the optical MAC layer 52 is configured to control the timing of the TX-enable signal 93 and, hence the timing of the laser-on and laser-off states of the optical transmitter 88 by controlling the timing of data transmissions from the residential gateway 49. FIG. 5 depicts the media converter 41 for such an exemplary embodiment.

As shown by FIG. 5, the media converter 41 comprises a transmitter control element 163 that is configured to monitor the data (TxD) transmitted from the residential gateway 49 (FIG. 4), as will be described in more detail below. During time slots that have not been allocated for transmissions from the optical MAC layer 52 (FIG. 4), no data is transmitted by the optical MAC layer 52 (FIG. 4) across the PON 21 (FIG. 1), and the optical transmitter 88 should be turned off to prevent it from interfering with the communication for other NIDs 33 occurring over the PON 21 (FIG. 1). Thus, the TX-enable signal 93 should be deasserted. During a time slot allocated for transmissions from the optical MAC layer 52 (FIG. 4), the optical MAC layer 52 begins to transmit a data stream comprising packets for transmission across the PON 21, as described above. The electrical transceiver 82 demodulates the data signals propagating across the connections 131-134 (FIG. 4) in order to recover the data stream. The electrical transceiver 82 transmits the recovered data stream to the buffer 166 and the transmitter control element 163.

Upon receiving the data stream, the transmitter control element 163 asserts the TX-enable signal 93. That is, upon detecting the presence of data from the electrical transceiver 82, the transmitter control element 163 is configured to assert the TX-enable signal 93 such that the optical transmitter 88 begins to power up, transitioning from a laser-off state to a laser-on state. Further, the buffer 166 delays the data stream received from the electrical transceiver 82 to provide the optical transmitter 88 sufficient time to power up so that the optical transmitter 88 is ready to transmit and emitting light when the data stream is received by it. In one exemplary embodiment, the buffer 166 delays the data stream by a period approximately equal to the power-up delay of the optical transmitter 88 within a desired margin of error to ensure that the optical transmitter 88 is ready to transmit upon receiving the beginning of the data stream.

During the allocated time slot, data flows through the buffer 166 and is transmitted by the optical transmitter 88 across the PON 21 to the OLT 25. At the end of the allocated time slot, the optical MAC layer 52 stops transmitting the data stream. The transmitter control element 163 is configured to determine when the data stream is no longer being received from the electrical transceiver 82 and to then deassert the TX-enable signal 93. Thus, once the data stream has been transmitted by the optical transmitter 88, the transmitter 88 transitions from a laser-on state to a laser-off state such that it stops emitting light across the PON 21.

In one exemplary embodiment, the optical MAC layer 52 continuously transmits characters even when it is not transmitting data for communication across the PON 21. When the optical MAC layer 52 is not transmitting data to be carried by the PON 21, the MAC layer 52 transmits idle characters. In one exemplary embodiment, each idle character is a logical 0 (though other types of idle characters, such as logical 1's may be used as the idle characters in other embodiments). Thus, a string of a certain number of logical 0's indicates that no data is being transmitted by the optical MAC layer 52.

The transmitter control element 163 is configured to determine whether to assert the TX-enable signal 93 based on the number of consecutive idle characters that are within a string of the most recently received data from the electrical transceiver 82. In one exemplary embodiment, the transmitter control element 163 is configured to analyze a window of a certain number of the most recent characters received from the transceiver 82. If the window includes any non-idle characters (e.g., logical 1's), then the transmitter control element 163 senses a presence of data and asserts the TX-enable signal 93. If the window includes only idle characters (e.g., logical 0s'), then the transmitter control element 163 senses an absence of data and deasserts the TX-enable signal 93. In another exemplary embodiment, the transmitter control element 163 counts the number of consecutively received idle characters in the most recent string of idle characters and compares the count to a predefined threshold. If the count is equal to or less than the threshold, then the transmitter control element 163 senses a presence of data and asserts the TX-enable signal 93. If the count exceeds the threshold, then the transmitter control element 163 senses an absence of data and deasserts the TX-enable signal 93. Other techniques for detecting a presence or absence of data from the optical MAC layer 52 are possible in other embodiments.

Note that there are various points from which the transmitter control element 163 can monitor the data stream to be transmitted to the optical transmitter 88 for the purposes of controlling the timing of the TX-enable signal 93. As an example, the transmitter control element 163 may monitor the data stream at the input of the buffer 166 for determining when to assert the TX-enable signal 93. Upon detecting a presence of data in such embodiment, the transmitter control element 163 immediately asserts the TX-enable signal 93. However upon detecting an absence of data indicative of the end of the data stream for the allocated time slot, the transmitter control element 163 waits a predefined time period to allow the buffer 166 to clear and then deasserts the TX-enable signal 93 causing the optical transmitter 88 to power down after transmitting the data buffered in the buffer 166.

In another embodiment, as shown by FIG. 5, the transmitter control element 163 is configured to monitor the data stream at the input of the buffer 166 for the purposes of determining when to assert the TX-enable signal 93, as described above. However, the transmitter control element 163 is also configured to receive the data stream transmitted by the buffer 166. In such embodiment, the transmitter control element 163 is configured to monitor the data stream at the output of the buffer 166 for the purpose of determining when to deassert the TX-enable signal 93. In this regard, the transmitter control element 163 is configured to deassert the TX-enable signal 93 when it detects an absence of data at the output of the buffer 166. In such embodiment, there is no need to wait a predefined time period after detecting the end of the data stream. In this regard, by the time the transmitter control element 163 detects the end of the data stream by monitoring the output of the buffer 166, the buffer 166 is already cleared of data such that the TX-enable signal 93 can be immediately deasserted. In yet other embodiments, other techniques for monitoring the data stream and for controlling the TX-enable signal 93 are possible.

In the embodiment shown by FIG. 5, the optical MAC layer 52 uses the timing of the data stream to be communicated across the PON 21 in order to control the timing of the laser-on and laser-off states of the optical transmitter 88. In this regard, for a given time slot allocated to the optical MAC layer 52 for communication across the PON 21, the optical MAC layer 52 begins to transmit the data stream at the beginning of the time slot within a given margin of error. There is a fixed delay, within a given margin of error, between the start of the data stream at the optical MAC layer 52 and the time that the optical transmitter 88 is powered up and begins to emit light. Further, there is a fixed delay, within a given margin of error, between the start of the data stream at the optical MAC layer 52 and the time that the optical transmitter 88 begins to modulate the first bit of the data stream. These fixed delays, within a given margin of error, are the same at the end of the time slot when the optical MAC layer 52 stops transmitting data and the optical transmitter 88 is powered down and stops emitting light. In this regard, the OLT 25 can learn these delays during the ranging process and compensate for these delays by adjusting the start and end times of the allocated time slot.

Accordingly, the residential gateway 49 and the NID 33 are configured to maintain a constant delay, within a given margin of error, between the start of the data stream at the optical MAC layer 52 and the and the start of the data stream at the optical transmitter 88, and between the start of the data stream at the optical MAC layer 52 and the time that the laser of the optical transmitter 88 turns on. There are corresponding constant delays, within a given margin of error, relative to the end of the data stream. In one exemplary embodiment, the maximum amount of time between the end of data stream transmission by the optical MAC layer 52 and the laser off time is approximately equal to: $D_{mod}+D_{buffer}+D_{power-down}+M$, where $D_{mod}$ is the modulation delay for the modulation and demodulation respectively performed by the electrical transceivers 77 and 82 plus the propagation delay from the electrical transceiver 77 to the electrical transceiver 82, $D_{buffer}$ is the delay introduced by the buffer 166, $D_{power-down}$ is the power-down delay of the optical transmitter 88, and M is a margin of error value.

An exemplary operation and use of the transmitter control element 163 will now be described in more detail with reference to FIGS. 6 and 7. Note that in FIG. 7, TxD represents the data transmitted by the optical MAC layer 52 (i.e., at the residential gateway 49), and TX-Enable represents the TX-enable signal 93 transmitted by the transmitter control element 163 (i.e., at the NID 33). Also, Optical$_{TxD}$ represents the data optically transmitted by the optical transmitter 88 (i.e., at the NID 33). The time slots are referenced to the optical MAC layer 52 (i.e., at the residential gateway 49).

Assume that the optical MAC layer 52 is configured to control the timing of the laser-on state of the optical transmitter 88 by controlling the timing of data packet transmissions from the residential gateway 49, as described above. Initially, assume that the current time slot, referred to as Time Slot 1 in FIG. 7, is not allocated for transmissions from the optical MAC layer 52. In such case, the optical MAC layer 52 is not transmitting data packets but rather is transmitting a long string of consecutive idle characters (e.g., 0's), as shown by FIG. 7. Further, the TX-enable signal 93 transmitted by the transmitter control element 163 is currently deasserted such that the optical transmitter 88 is turned off, as shown by FIG. 7. For illustrative purposes, assume that the next time slot, referred to as Time Slot 2 in FIG. 7, is allocated for transmissions from the optical MAC layer 52.

Figure 7:
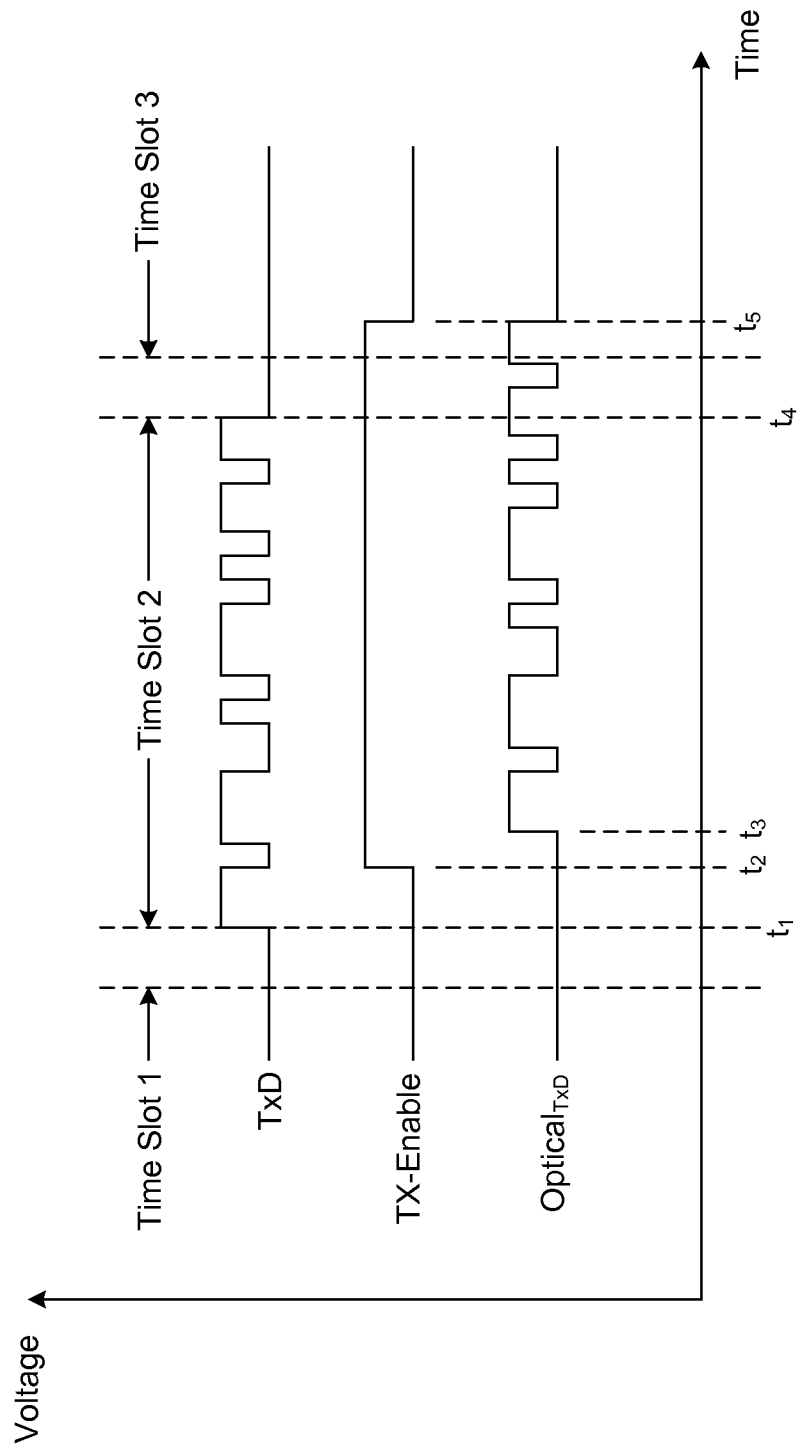
FIG. 7 is a timing diagram illustrating timing relationships between signals communicated by equipment at a customer premises, such as is depicted by FIG. 2.

At the start of Time Slot 2, the optical MAC layer 52 begins to transmit data packets at time $t_1$, as shown by FIG. 7. Thus, between times $t_1$ and $t_4$, at least some of the characters transmitted from the optical MAC layer 52 to the electrical transceiver 77 are non-idle characters (e.g., 1's).

Figure 6:
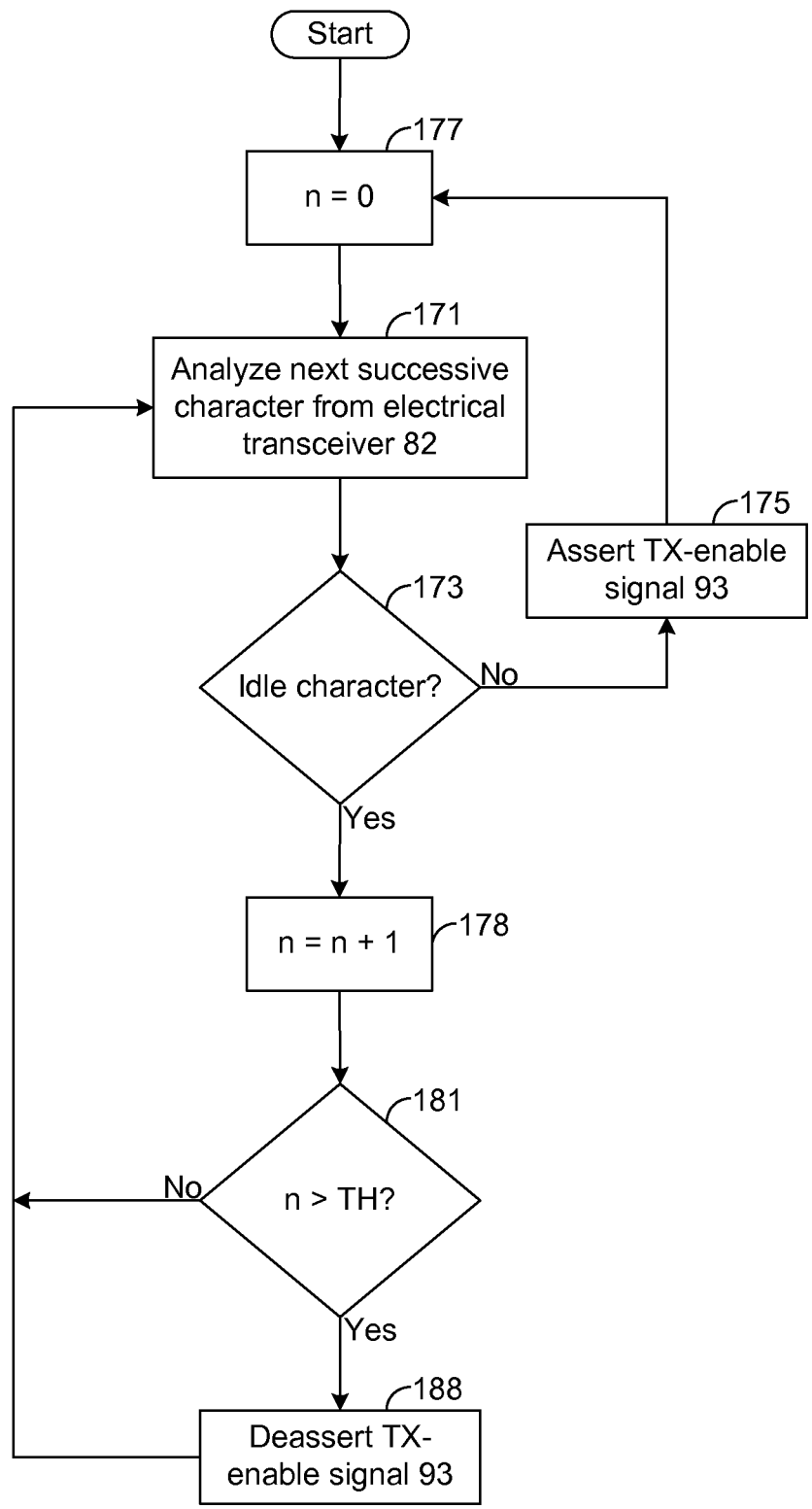
FIG. 6 is a flow chart illustrating an exemplary method of controlling a TX-enable signal for an optical transmitter, such as is depicted by FIG. 5.

Eventually, the first non-idle character transmitted by the optical MAC layer 52 in the current example is received by the transmitter control element 163, which consecutively analyzes each character of the packet in block 171 of FIG. 6. For each character, the transmitter control element 163 determines whether it is an idle character in block 173 of FIG. 6. When a non-idle character is analyzed, the transmitter control element 163 makes a "no" determination in block 173 and thus asserts the TX-enable signal 93, as shown by block 175 of FIG. 6. Accordingly, upon receiving the first non-idle character of the first data packet for the allocated time slot, the transmitter control element 163 asserts the TX-enable signal 93 at time $t_2$ (FIG. 7) causing the optical transmitter 88 to begin powering up.

After a finite amount of time from the transition of the TX-enable signal 93 at time $t_2$, the optical transmitter 88 is turned on and begins to emit light. Shortly thereafter, the optical transmitter 88 begins to receive the data stream transmitted by the optical MAC layer 52 and buffered by the buffer 166, and the optical transmitter 88 begins to transmit such data stream across the fiber 36 (FIG. 3) at time $t_3$. The transmitter control element 163 also sets a value, n, to zero, as shown by block 177. Note that n represents a dynamic count of the number of successive idle characters currently received by the transmitter control element 163. In this regard, each time the transmitter control element 163 identifies an idle character in block 171, the transmitter control element 163 increments n, as shown by blocks 173 and 178 of FIG. 6.

As shown by block 181 of FIG. 6, the transmitter control element 163 compares n to a threshold, TH, each time it identifies an idle character. The threshold is set to a value that is likely higher than the longest string of non-idle characters expected in a transmitted data packet such that an n value higher than TH indicates that the optical MAC layer 52 has stopped transmitting data packets.

While the optical MAC layer 52 continues to transmit data packets in Time Slot 2, the value of n likely will not exceed TH since it is reset to 0 each time a non-idle character is received, and the TX-enable signal 93 remains asserted. At the end of Time Slot 2, the optical MAC layer 52 stops transmitting data and begins to transmit idle characters at time $t_4$ in FIG. 7. Thus, at some point thereafter, the transmitter control element 163 stops receiving data packets and instead begins receiving a long string of consecutive idle characters. When the transmitter control element 163 begins to receive and analyze such string, the value of n will eventually exceed TH such that the transmitter control element 163 makes "yes" determination in block 181 of FIG. 6. Thus, the transmitter control element 163 deasserts the TX-enable signal 93 at time $t_5$, thereby causing the optical transceiver 88 to begin powering down, as shown by block 188 of FIG. 6. Accordingly, the optical transmitter 88 turns off and stops emitting light shortly after $t_5$. Once deasserted, the TX-enable signal 93 remains deasserted until the transmitter control element 163 detects a non-idle character, which occurs after the optical MAC layer 52 has begun transmitting data packets for the next time slot that is allocated for transmissions from the optical MAC layer 52.

In other embodiments, the timing relationships shown by FIG. 7 may be different. For example, if the TX-enable signal 93 is transmitted from the optical MAC layer 52 using the PoE control channel, as shown by FIG. 4, the optical MAC layer 52 may be configured to assert the TX-enable signal prior to the start of data transmission (i.e., prior to time $t_1$) and specifically prior to Time Slot 2, such as between the end of Time Slot 1 and the beginning of Time Slot 2.

Note that it is possible for the transmitter control element 163 to be configured to monitor the control information from the OLT 25 in order to determine when time slots have been allocated for transmissions from the optical MAC layer 52. In such embodiments, the transmitter control element 163 may be configured to control the timing of the TX-enable signal 93 such that it is unnecessary for the optical MAC layer 52 to control the timing of the TX-enable signal 93 across the non-optical channel 46. However, such an embodiment may undesirably increase the complexity, as well as the cost and power consumption, of the NID 33 relative to the embodiments described above in which the timing of the TX-enable signal 93 is controlled by the optical MAC layer 52. Other functions described above as being performed by the optical MAC layer 52 may be implemented by the NID 33 or other devices, if desired, but as described above, decreasing the complexity, cost, and power consumption of the NID 33 is generally desirable.

To further help in reducing the complexity, cost, and power consumption of the NID 33, the data rate of the non-optical channel 46 preferably matches the data rate of the PON side of the NID 33. Such a feature helps to minimize buffering and control within the NID 33. In one exemplary embodiment, communication across the PON 21 is in accordance with EPON standards (e.g., I.E.E.E. 802.3 Standard EPON), and communication across the non-optical channel 46 is in accordance with Gigabit Ethernet (GigE) standards (e.g., I.E.E.E. 802.3 Standard 1000BASE-T) such that the data rate on both sides of the NID 33 is equal to one gigabit per second. In other embodiments, other protocols and data rates are possible.

It should be noted that the extension of the PON 21 across the non-optical channel 46 to the residential gateway 21 adds latency that could have an effect on network timing for the PON 21. As an example, PON ranging is a known technique by which an OLT communicates with an ONU to determine the ONU's round trip delay from the OLT. Such round trip delay information is then used in allocating time slots and preventing data collisions on the PON.

On the CP side, the ranging is controlled by the optical MAC layer 52, and implementing the optical MAC layer 52 at the residential gateway 49, as described above, affects the effective optical round trip delay between the OLT 25 and the CP 27. In one exemplary embodiment, the modulation delay introduced by the electrical transceivers 77 and 82 in the downstream direction matches the modulation delay introduced by the electrical transceivers 77 and 82 in the upstream direction. In such case, though the extension of the PON 21 across the non-optical channel 46 affects the ranging operations, there should be no adverse impact to the operation of the PON 21 that would cause any data collisions or errors. In this regard, the OLT 25 would determine the total round trip delay, including the delay through the electrical transceivers, and would appropriately account for the added delay in controlling the PON 21 and, specifically, in allocating time slots. Indeed, the extension of the PON 21 across the non-optical channel 46 is transparent to the OLT 25, except for the increase in range sensed by the OLT 25, as described above.

In some embodiments, forward error correction (FEC) may be used in an effort to improve the robustness and quality of data transmission for the PON 21. As known in the art, FEC is a process by which redundant information about the data being transmitted is appended to a data packet at a transmitter, and such information is used by a receiver of the data packet to correct transmission errors that occur as the packet is propagating from the transmitter to the receiver. Since a portion of the transmitted data stream carries FEC information, thereby increasing overhead, the data stream generally carries less payload than would be possible if FEC is not employed. Thus, the overall payload rate is typically reduced when FEC is employed, but reliability of the data is increased.

Figure 8:
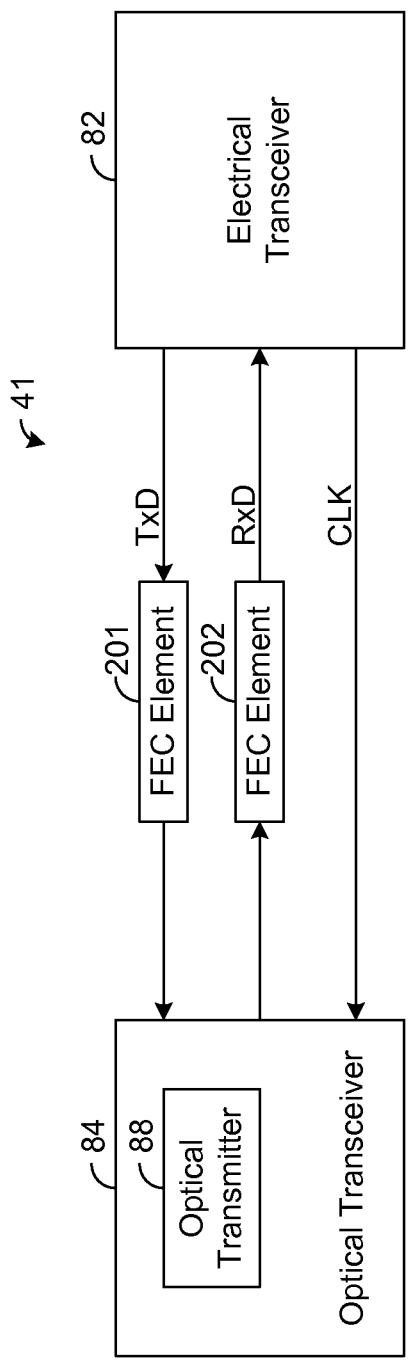
FIG. 8 is a block diagram illustrating an exemplary embodiment of a media converter, such as is depicted by FIG. 2.

Depending on the protocols employed, it is possible for the transmission of FEC information to be incompatible with or problematic for the protocol used for the non-optical channel 46 between the NID 33 and the residential gateway 49. In one exemplary embodiment, as shown by FIG. 8, the media converter 41 comprises FEC elements 201 and 202 that are used to process FEC information so that the transmissions between the media converter 41 and the residential gateway 49 are free of FEC information. Accordingly, if a protocol for the non-optical channel 46 is incompatible with FEC information, it is possible for FEC to be employed for communication between the media converter 41 and the OLT 25 without attempting to communicate such information between the media converter 41 and the residential gateway 49.

Referring to FIG. 8, when the FEC element 201 receives a data stream in the upstream direction from the electrical transceiver 82, the FEC element 201 is configured to divide the data stream into FEC codewords and generate the redundant FEC information for each codeword. The FEC element 201 then forwards the modified data stream to the optical transceiver 84 for communication across the PON 21.

When the FEC element 202 receives a FEC-encoded data stream in the downstream direction from the optical transceiver 84, the FEC element 202 is configured to strip the FEC information from the data stream. The FEC element 202 also uses the stripped FEC information to correct for errors, if any, in the data stream. The FEC element 202 then forwards the recovered packets to the electrical transceiver 82 for communication across the non-optical channel 46.

Note that the processing of the FEC information at the media converter 41, as described above, generally adds complexity to the media converter 41 and, thus, increases the cost and power consumption of the NID 33. Indeed, the FEC elements 201 and 202 may be equipped with additional buffering to enable sufficient processing of the FEC information while maintaining desired timing relationships for the communication across the PON 21. Further, if FEC is employed, then the transmission rate (inclusive of both information and parity) for the PON 21 will generally need to be greater than the transmission rate for the non-optical channel 46 adding to the complexity of the media converter 41. Although implementation of FEC elements 201 and 202 at the media converter 41 may increase the complexity of the media converter 41, it has the advantage of permitting the use of FEC across the PON 21 between the media converter 41 and the OLT 25 without requiring the protocol selected for the communication between the media converter 41 and the residential gateway 49 to support FEC.

Now, therefore, the following is claimed:

1. A communication system, comprising:
a media converter having an optical transceiver and a first electrical transceiver, the optical transceiver coupled to an optical line terminal (OLT) via an optical fiber of an optical network, the first electrical transceiver configured to receive an electrical data signal from a non-optical channel and to demodulate the electrical data signal to recover a data stream comprising data packets carried by the electrical data signal, the first electrical transceiver further configured to transmit the data stream to the optical transceiver, wherein the optical transceiver has an optical transmitter configured to modulate an optical signal with the data stream, thereby forming an optical data signal, and to transmit the optical data signal across the optical fiber to the OLT;
a customer premises (CP) device communicatively coupled to the media converter at a customer premises, the CP device having a second electrical transceiver and an optical media access control (optical MAC) layer configured to form the data packets according to an optical network protocol for the optical network and to manage communication of the data packets across the optical network, the second electrical transceiver configured to modulate an electrical carrier signal with the data stream, thereby forming the electrical data signal, and to transmit the electrical data signal across the non-optical channel to the first electrical transceiver of the media converter, the optical MAC layer configured to receive control information from the OLT via a control channel of the optical network and determine, based on the control information, time slots allocated for transmissions across the optical network by the optical MAC layer, the optical MAC layer further configured to control when the optical transmitter transitions between laser-on and laser-off states based on the allocated time slots; and
a power supply configured to receive a power signal from the CP device and to power the first electrical transceiver based on the power signal, wherein the CP device is configured to modulate the power signal with control data, and wherein the optical transmitter is configured transition between the laser-on and laser-off states based on the control data.

2. The system of claim 1, wherein the CP device comprises a residential gateway.

3. The system of claim 1, wherein the non-optical channel comprises a conductive connection, and wherein the first electrical transceiver is coupled to the second electrical transceiver via the conductive connection.

4. The system of claim 1, wherein the non-optical channel comprises an Ethernet cable, and wherein the first electrical transceiver is coupled to the second electrical transceiver via the Ethernet cable.

5. The system of claim 1, wherein the non-optical channel is wireless.

6. A method, comprising:
forming, via an optical media access control (optical MAC) layer of a customer premises (CP) device, data packets according to an optical network protocol for an optical network, wherein the CP device is communicatively coupled to a media converter at a customer premises via a non-optical channel;
modulating an electrical carrier signal with a data stream comprising the data packets, thereby forming an electrical data signal;
transmitting the electrical data signal from the CP device to the media converter via the non-optical channel;
demodulating the received electrical data signal via the media converter, thereby recovering the data stream carried by the electrical data signal;
modulating an optical signal with the data packets via the media converter, thereby forming an optical data signal;
transmitting, via an optical transmitter of the media converter, the optical data signal across an optical fiber of an optical network to an optical line terminal (OLT);
receiving control information from the OLT via a control channel of the optical network;
determining, based on the control information, time slots allocated for transmissions across the optical network by the optical MAC layer;
defining control data based on the determining;
transmitting a power signal from the CP device to the media converter;
modulating the power signal with the control data;
powering at least one component of the media converter via the power signal; and
controlling a laser-on state of the optical transmitter based on the control data.

7. The method of claim 6, wherein the non-optical channel is wireless.

8. The method of claim 6, wherein the CP device comprises a residential gateway.

9. The method of claim 6, wherein the non-optical channel comprises a plurality of conductive connections, and wherein the CP device is coupled to the media converter via the conductive connections.

10. A communication system, comprising:
a media converter having an optical transceiver and a first electrical transceiver, the optical transceiver coupled to an optical line terminal (OLT) via an optical fiber of an optical network, the first electrical transceiver configured to receive an electrical data signal from a non-optical channel and to demodulate the electrical data signal to recover a data stream comprising data packets carried by the electrical data signal, the first electrical transceiver further configured to transmit the data stream to the optical transceiver, wherein the optical transceiver has an optical transmitter configured to modulate an optical signal with the data stream, thereby forming an optical data signal, and to transmit the optical data signal across the optical fiber to the OLT;
a customer premises (CP) device communicatively coupled to the media converter at a customer premises, the CP device having a second electrical transceiver and an optical media access control (optical MAC) layer configured to form the data packets according to an optical network protocol for the optical network and to manage communication of the data packets across the optical network, the second electrical transceiver configured to modulate an electrical carrier signal with the data stream, thereby forming the electrical data signal, and to transmit the electrical data signal across the non-optical channel to the first electrical transceiver of the media converter, the optical MAC layer configured to receive control information from the OLT via a control channel of the optical network and determine, based on the control information, time slots allocated for transmissions across the optical network by the optical MAC layer, the optical MAC layer further configured to control when the optical transmitter transitions between laser-on and laser-off states based on the allocated time slots, wherein the optical MAC layer is configured to transmit an indication to the media converter via a conductive connection, wherein the media converter is configured to transition the optical transmitter to the laser-on state or the laser-off state in response to the indication, and wherein the media converter is configured to delay the indication by a sufficient amount to account for at least a modulation delay associated with the electrical carrier signal; and a power supply configured to receive a power signal from the CP device via the conductive connection, the power supply configured to power the first electrical transceiver based on the power signal, wherein the CP device is configured to modulate the power signal with the indication.

11. The system of claim 1, wherein the optical MAC layer is configured to transmit the electrical data signal across the non-optical channel via a first conductive connection, and wherein the CP device is configured to transmit the modulated power signal via a second conductive connection and a third conductive connection to the media converter via an out-of-band control channel.

* * * * *